(12) United States Patent
Chuong et al.

(10) Patent No.: US 9,562,478 B2
(45) Date of Patent: Feb. 7, 2017

(54) INTER-MODULE FINGER SEAL

(71) Applicant: United Technologies Corporation, Hartford, CT (US)

(72) Inventors: Conway Chuong, Manchester, CT (US); Matthew Budnick, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1231 days.

(21) Appl. No.: 13/730,886

(22) Filed: Dec. 29, 2012

(65) Prior Publication Data

US 2014/0248126 A1 Sep. 4, 2014

(51) Int. Cl.
*F02C 7/28* (2006.01)
*F01D 25/16* (2006.01)

(52) U.S. Cl.
CPC ............... *F02C 7/28* (2013.01); *F01D 25/162* (2013.01); *F05D 2240/57* (2013.01)

(58) Field of Classification Search
CPC ............ F16J 15/00; F16J 15/02; F16J 15/021; F16J 15/022; F16J 15/024; F02C 7/28; F01D 25/162; F01D 25/24; F05D 2240/57; F05D 2240/11; F05D 2240/55; F05D 2240/59
See application file for complete search history.

(56) References Cited

U.S. PATENT DOCUMENTS

| | | | |
|---|---|---|---|
| 2,124,108 A | 7/1938 | Grece | |
| 3,576,328 A | 4/1971 | Vose | |
| 3,970,319 A | 7/1976 | Carroll et al. | |
| 4,088,422 A | 5/1978 | Martin | |
| 4,114,248 A | 9/1978 | Smith et al. | |
| 4,478,551 A | 10/1984 | Honeycutt, Jr. et al. | |
| 4,645,217 A | 2/1987 | Honeycutt, Jr. et al. | |
| 4,678,113 A | 7/1987 | Bridges et al. | |
| 4,738,453 A | 4/1988 | Ide | |
| 4,756,536 A | 7/1988 | Belcher | |
| 4,920,742 A | 5/1990 | Nash et al. | |
| 4,987,736 A | 1/1991 | Ciokajlo et al. | |
| 4,993,918 A | 2/1991 | Myers et al. | |
| 5,031,922 A | 7/1991 | Heydrich | |
| 5,042,823 A | 8/1991 | Mackay et al. | |
| 5,071,138 A | 12/1991 | Mackay et al. | |
| 5,100,158 A | 3/1992 | Gardner | |
| 5,108,116 A | 4/1992 | Johnson et al. | |
| 5,169,159 A | 12/1992 | Pope et al. | |

(Continued)

FOREIGN PATENT DOCUMENTS

EP 2447520 A2 5/2012

OTHER PUBLICATIONS

International Searching Authority, PCT Notification of Transmittal of the International Search Report and the Written Opinion, Apr. 11, 2014, 14 pages.

*Primary Examiner* — Dwayne J White
*Assistant Examiner* — Danielle M Christensen
(74) *Attorney, Agent, or Firm* — Kinney & Lange, P.A.

(57) ABSTRACT

An assembly for a gas turbine engine includes a first module, a second module, and a finger seal. The second module is connected to the first module along a joint. The finger seal is connected to the first module at a fixed end and has a free end that cantilevers from the fixed end to contact the second module. The finger seal acts to seal the joint between the first module and second module from an ingestion gas flow of the gas turbine engine.

19 Claims, 5 Drawing Sheets

(56) References Cited

U.S. PATENT DOCUMENTS

| | | |
|---|---|---|
| 5,174,584 A | 12/1992 | Lahrman |
| 5,188,507 A | 2/1993 | Sweeney |
| 5,211,541 A | 5/1993 | Fledderjohn et al. |
| 5,236,302 A | 8/1993 | Weisgerber et al. |
| 5,246,295 A | 9/1993 | Ide |
| 5,273,397 A | 12/1993 | Czachor et al. |
| 5,338,154 A | 8/1994 | Meade et al. |
| 5,370,402 A | 12/1994 | Gardner et al. |
| 5,385,409 A | 1/1995 | Ide |
| 5,401,036 A | 3/1995 | Basu |
| 5,474,305 A | 12/1995 | Flower |
| 5,558,341 A | 9/1996 | McNickle et al. |
| 5,632,493 A | 5/1997 | Gardner |
| 5,755,445 A | 5/1998 | Arora |
| 5,911,400 A | 6/1999 | Niethammer et al. |
| 5,961,279 A | 10/1999 | Ingistov |
| 6,196,550 B1 | 3/2001 | Arora et al. |
| 6,343,912 B1 | 2/2002 | Manteiga et al. |
| 6,364,316 B1 | 4/2002 | Arora |
| 6,439,841 B1 | 8/2002 | Bosel |
| 6,601,853 B2 | 8/2003 | Inoue |
| 6,619,030 B1 | 9/2003 | Seda et al. |
| 6,637,751 B2 | 10/2003 | Aksit et al. |
| 6,637,752 B2 | 10/2003 | Aksit et al. |
| 6,638,013 B2 | 10/2003 | Nguyen et al. |
| 6,652,229 B2 | 11/2003 | Lu |
| 6,736,401 B2 | 5/2004 | Chung et al. |
| 6,805,356 B2 | 10/2004 | Inoue |
| 6,811,154 B2 | 11/2004 | Proctor et al. |
| 6,935,631 B2 | 8/2005 | Inoue |
| 6,983,608 B2 | 1/2006 | Allen, Jr. et al. |
| 7,094,026 B2 | 8/2006 | Coign et al. |
| 7,238,008 B2 | 7/2007 | Bobo et al. |
| 7,367,567 B2 | 5/2008 | Farah et al. |
| 7,371,044 B2 | 5/2008 | Nereim |
| 7,631,879 B2 | 12/2009 | Diantonio |
| 7,735,833 B2 | 6/2010 | Braun et al. |
| 7,798,768 B2 | 9/2010 | Strain et al. |
| 7,857,576 B2 | 12/2010 | Durocher et al. |
| 8,069,648 B2 | 12/2011 | Snyder et al. |
| 8,083,465 B2 | 12/2011 | Herbst et al. |
| 8,152,451 B2 | 4/2012 | Manteiga et al. |
| 8,221,071 B2 | 7/2012 | Wojno et al. |
| 8,245,518 B2 | 8/2012 | Durocher et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2003/0122316 A1* | 7/2003 | Aksit ............... F01D 11/005 277/409 |
| 2005/0046113 A1 | 3/2005 | Inoue |
| 2005/0244267 A1 | 11/2005 | Coign et al. |
| 2006/0197287 A1* | 9/2006 | Farah ............... F01D 11/003 277/549 |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0276895 A1 | 11/2010 | Taylor et al. |
| 2010/0307165 A1 | 12/2010 | Wong et al. |
| 2011/0000223 A1 | 1/2011 | Russberg |
| 2011/0214433 A1 | 9/2011 | Feindel et al. |
| 2011/0262277 A1 | 10/2011 | Sjoqvist et al. |
| 2012/0111023 A1 | 5/2012 | Sjoqvist et al. |

* cited by examiner

INTER-MODULE FINGER SEAL

BACKGROUND

The invention relates to gas turbine engines, and more particularly to a seal disposed between engine modules.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For ease of assembly, gas turbine engines are typically designed in sections typically called modules. Each section is comprised of various components. The modules are then assembled together at the engine level. W-seals, feather, and/or dog-bone seals are typically used between modules to seal the modules against ingestion gas flow from a main gas flow path of the gas turbine engine. However, these seals utilize a firm contacting interface that imparts a relatively large load on the modules in the axial direction to accomplish the sealing.

SUMMARY

An assembly for a gas turbine engine includes a first module, a second module, and a finger seal. The second module is connected to the first module along a joint. The finger seal is connected to the first module at a fixed end and has a free end that cantilevers from the fixed end to contact the second module. The finger seal acts to seal the joint between the first module and second module from an ingestion gas flow of the gas turbine engine.

An assembly for a gas turbine engine includes a first outer radial casing section, a second outer radial casing section, and a finger seal. The second casing section has a leading end that is connected to a trailing end of the first casing section. The finger seal is mounted to the first casing section at a fixed end and is contacted and deflected by the second casing section along an arcuate portion of a free end of the finger seal.

A turbine section for a gas turbine engine includes a first module, a second module, and a finger seal. The first module has a first casing section disposed radially outward of a fairing. The second module has a second casing section with a leading end that is connected to a trailing end of the first casing section. The finger seal is disposed radially outward from both the fairing and a main gas flow path of the gas turbine engine. The finger seal cantilevers from a first fixed section mounted to the first casing section to a free end that is deflected by the second casing section. The free end has an arcuate portion with a peak that is arranged to contact an inner radial surface of the second casing section in order to seal an area between the first casing section and the second casing section from an ingestion gas flow.

DETAILED DESCRIPTION

A finger seal is mounted to a first module and extends across a joint between the first module and a second module. The finger seal is fixed on a first end to the first module and is free on a second end. The free end is arranged to contact and be deflected by the second module along an arcuate portion of the finger seal. The finger seal acts to seal and redirect an ingestion gas flow away from the joint between the modules and/or keep cooling air in the area of the joint.

Figure 1:
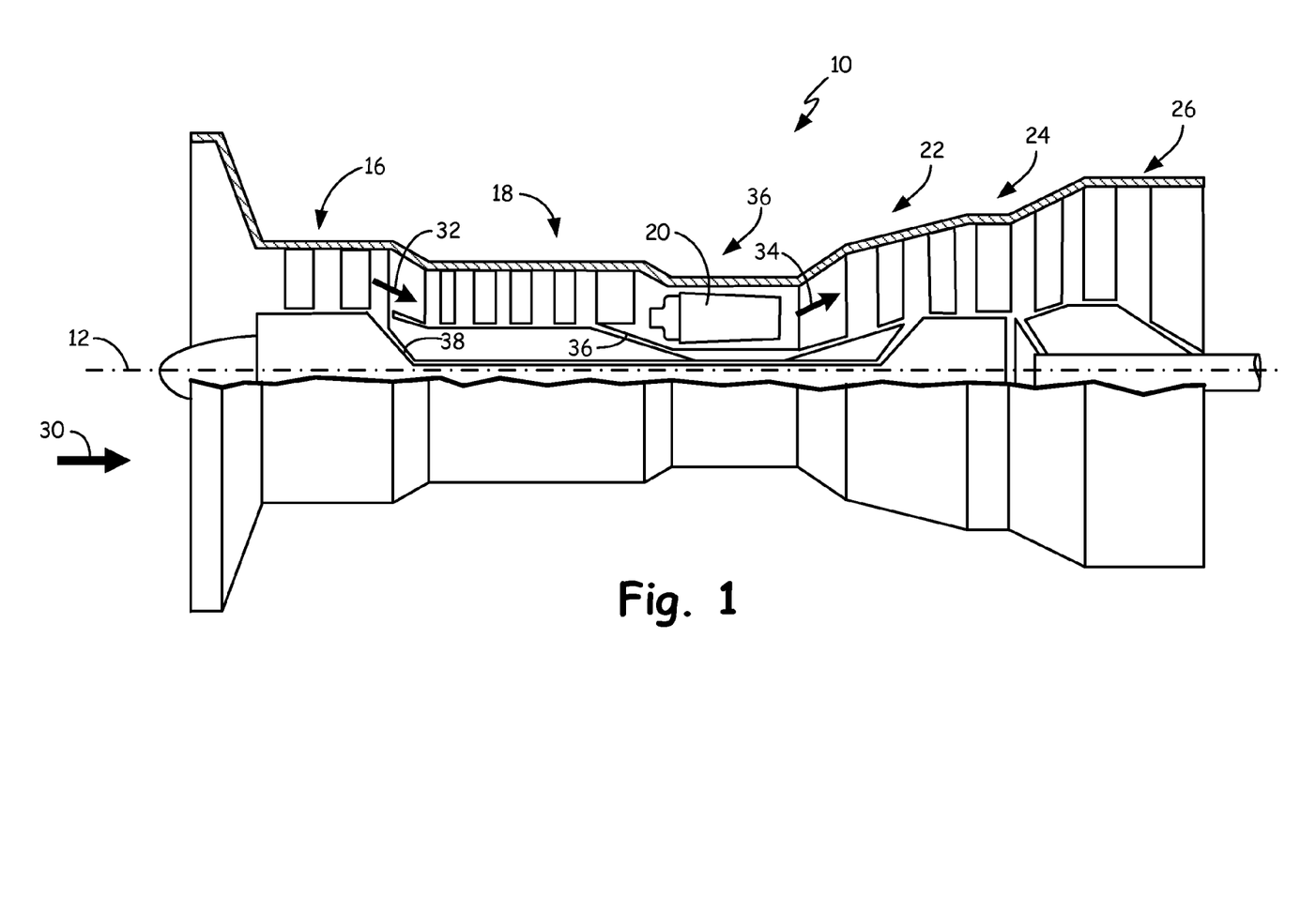
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
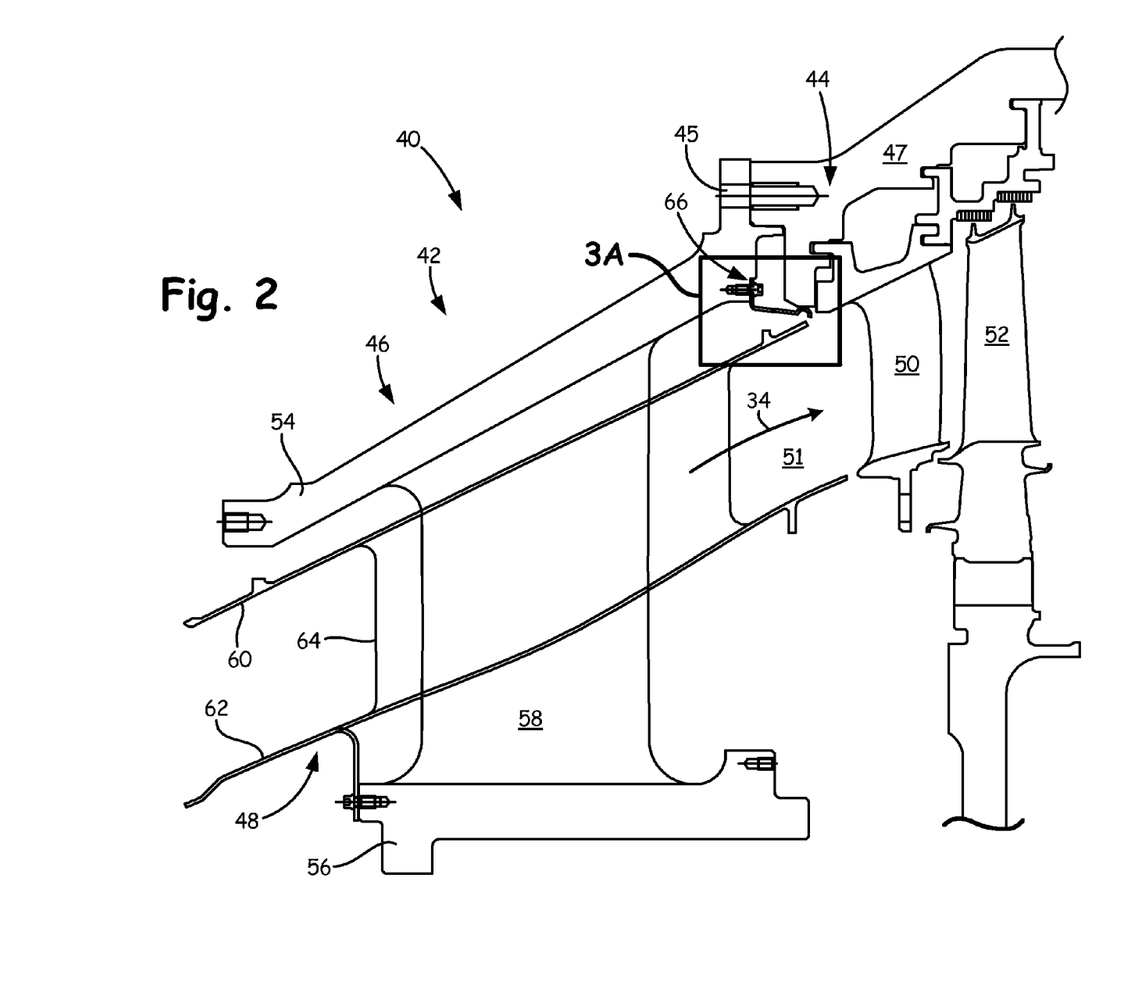
FIG. 2 is a cross-section of an assembly including a first module, a finger seal, and a second module arranged together.

FIG. 2 shows an assembly 40 of a first module 42 and a second module 44 interconnected by fasteners 45. First module 42 includes a frame 46 and a fairing 48. Second module 44 includes a stator vane 50 and a rotor blade 52. Frame 46 includes an outer radial casing 54, an inner radial platform 56, and struts 58. Fairing 48 includes an outer radial platform 60, and inner radial platform 62, and strut liners 64. Finger seal 66 is disposed between first module 42 and second module 44.

First module 42 comprises a portion of gas turbine engine 10 (FIG. 1), and therefore, can form portions of compressor sections 16 and 18 or turbine sections 22 and 24. First module 42 includes various components including outer radial casing 54 and other components of frame 46 and fairing 48. Second module 44 is connected to first module 42 via fasteners 45 such that modules 42 and 44 abut along casings 54 and 47. In addition to outer radial casing 47, second module 44 additionally houses components such as stator vane 50 and rotor blade 52 therein. Vane 50 and blade 52 are disposed downstream of frame 46 and fairing 48 with respect to the direction of flow of combustion gases 34 along main engine gas flow path 51.

Similar to first module 42, second module 44 includes various components including outer radial casing 47, stator vane 50, and a rotor blade 52. As previously discussed, gas turbine engines typically are divided into modules for ease of assembly and design. Modules such as first module 42 and second module 44 are then assembled together at the engine level to create the various engine portions illustrated for gas turbine engine 10 of FIG. 1.

In the embodiment shown, first module 42 includes frame 46 which extends axially along and generally radially through main engine gas flow path 51. Outer radial casing 54 is connected to inner radial platform 56 by struts 58 (only one is shown in FIG. 2). Fairing 48 is affixed to frame 46 and is adapted to be disposed within frame 46 radially inward of outer radial casing 54 and radially outward of inner radial platform 56. Strut liners 64 are adapted to be disposed around struts 58.

Outer radial platform 60 of fairing 48 has a generally conical shape. Similarly, inner radial platform 62 has a generally conical shape. Inner radial platform 62 is spaced from outer radial platform 60 by strut liners 64. Outer radial platform 60, inner radial platform 62, and strut liners 64, form a portion of main engine gas flow path 51 of gas turbine engine 10 when assembled. Combustion gases 34 pass through main engine gas flow path 51 during operation.

As illustrated in FIG. 2, finger seal 66 is disposed between outer radial casing 54 of first module 42 and outer radial casing 47 of second module 44. Finger seal 66 is located at a radial distance away from outer radial platform 60 of fairing 48 as well as main engine gas flow path 51. As will be discussed subsequently, finger seal 66 is deflected by outer radial casing 47 of second module 44 and contacts outer radial casing 47 along an arcuate portion of a free end of finger seal 66 to create a seal for the joint between modules 42 and 44. As a result of arcuate portion and chamfers on lead in portions of outer radial casing 47, the potential for installation damage to finger seal 66 is reduced or eliminated.

Figure 3A:
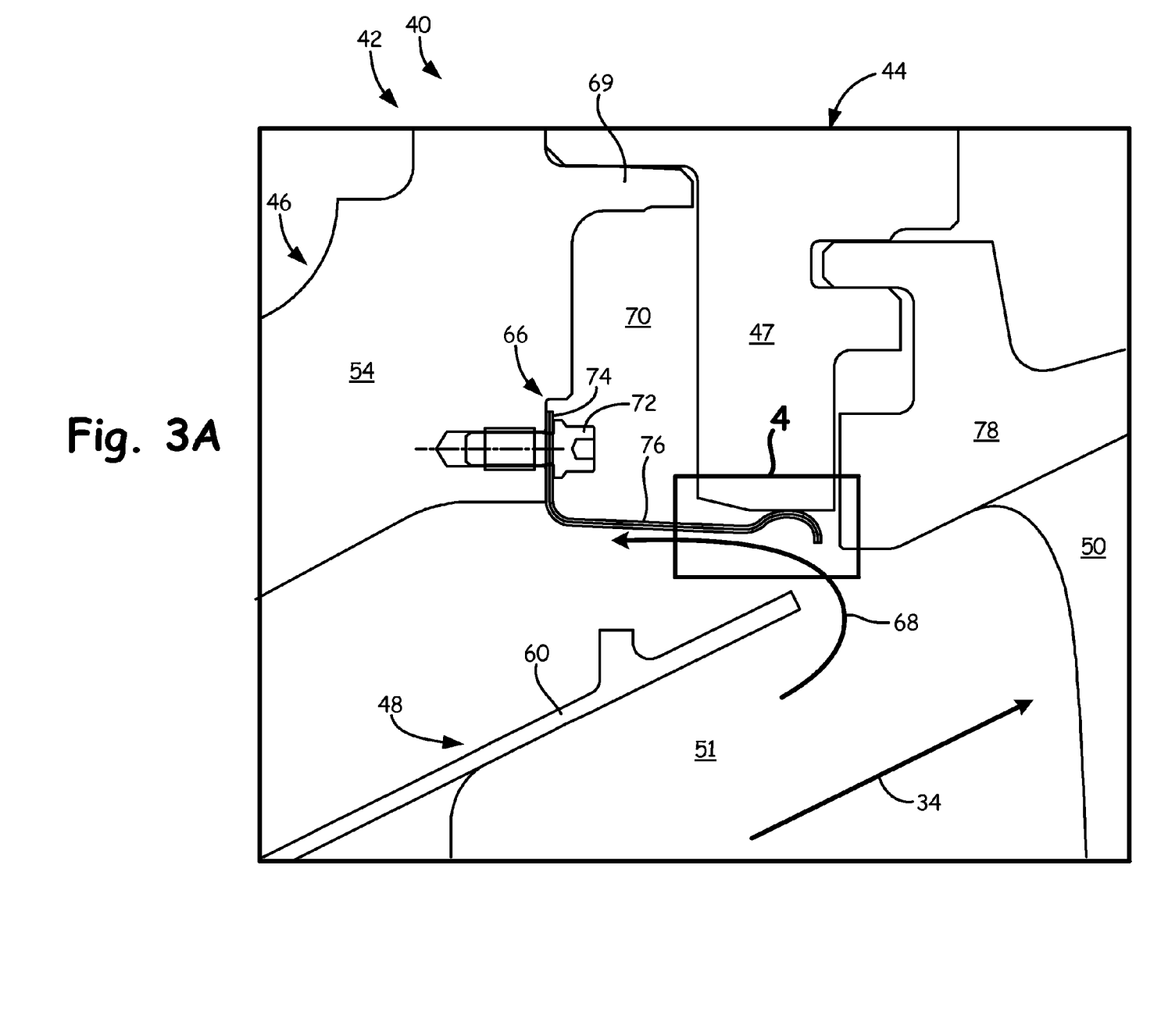
FIG. 3A is an enlarged cross-section of the assembly of FIG. 2 including the first module, finger seal, and second module arranged together.
Figure 3B:
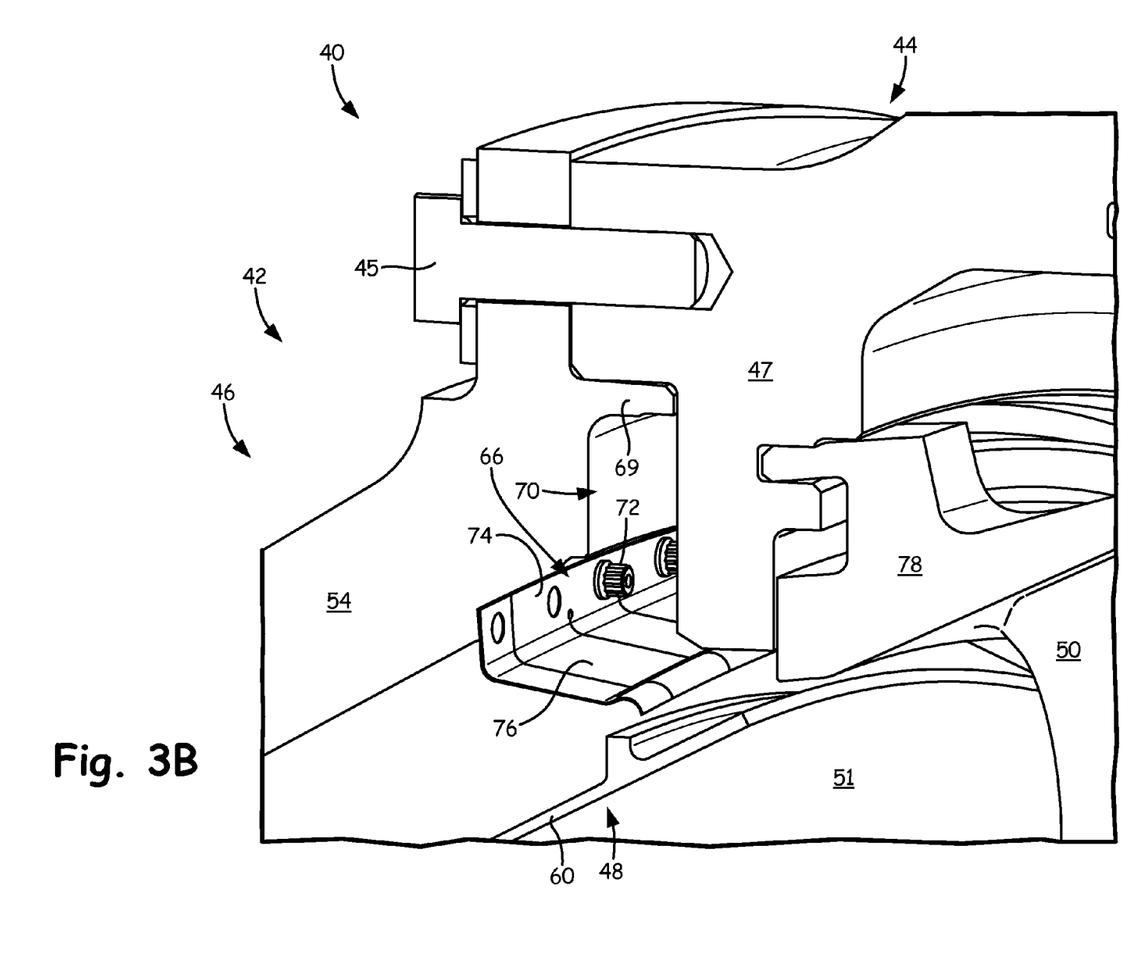
FIG. 3B is a perspective view showing the first module, finger seal, and second module.

FIGS. 3A and 3B show a cross-section of assembly 40 with finger seal 66 mounted to outer radial casing 54 of first module 42 and extending aft to contact outer radial casing 47 of second module 44. In addition to frame 46, fairing 48, vane 50, assembly 40 includes a flange 69, a cavity 70, fasteners 72, and a vane platform 78. Finger seal 66 includes a fixed end 74 and a free end 76.

As shown in FIGS. 3A and 3B, outer radial casing 54 can include flange 69 that snaps into an interference fit with a mating portion of outer radial casing 47 along the joint between first module 42 and second module 44. As described previously, finger seal 66 is mounted between first module 42 and second module 44 radially inward of flange 69 and seals and redirects ingestion airflow 68 away from the joint between first module 42 and second module 44.

Cavity 70 is disposed radially outward of finger seal 66 and is formed along the joint between first module 42 and second module 44. Finger seal 66 separates cavity 70 from outer radial platform 60 of fairing 48. Fasteners 72 are disposed circumferentially along cavity 70 and mount finger seal 66 at fixed end 74 to first module 42. In other embodiments, fixed end 74 can be affixed with other methods such as welds, rivets, and/or clamps. As shown in FIG. 3B, finger seal 66 can comprise a full ring with circumferentially spaced features for hoop stress relief. The finger seal 66 has circumference that differs slightly from those of casings 54 and 47. In other embodiments, finger seal 66 may be mounted to second module 44 rather than first module 42.

Finger seal 66 is attached to first module 42 along fixed end but free end 76 is free to cantilever outward and be deflected by second module 44. The arrangement of finger seal 66 with an arcuate portion of free end 76 in contact with second module 44 results in a seal between finger seal 66 and second module 44. Thus, finger seal 66 is arranged to be urged into contact with second module 44 in order to seal the joint between first module 42 and second module 44.

In operation, an ingestion gas flow 68 may pass from main engine gas flow path 51 aft of outer radial platform 60 and enter a space between fairing 48 and outer radial casing 54. Finger seal 66 acts to seal cavity 70 from ingestion gas flow 68 and to direct ingestion gas flow 68 away from cavity 70 and the joint between first module 42 and second module 44. Although finger seal 66 is disposed radially outward of main engine gas flow path 51 and fairing 48 in FIGS. 2-3B, in other embodiments, finger seal 66 can be disposed radially inward of main engine gas flow path 51.

Figure 4:
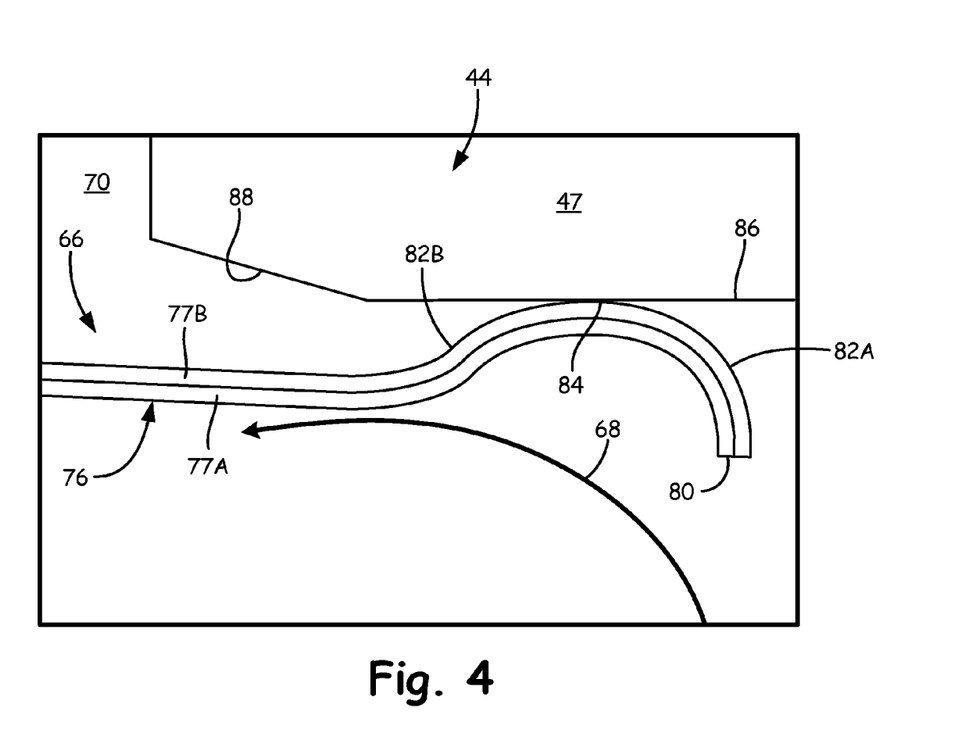
FIG. 4 is an enlarged cross-section of the first module, finger seal, and second module specifically showing the configuration of the finger seal in contact with the second module.

FIG. 4 shows finger seal 66 extending to contact outer radial casing 47 of second module 44. In addition to free end 76, ingestion gas flow 68, and cavity 70, FIG. 4 shows a first layer 77A, a second layer 77B, an aft end 80, arcuate segments 82A and 82B, a peak 84, an inner radial surface 86, and a chamfer 88.

Finger seal 66 is formed of thin deflectable and formable metal such as sheet stock and has first layer 77A disposed radial inward of second layer 77B. Second layer 77B is disposed over and overlaps first layer 77A. Use of multiple laminate layers such as first and second layers 77A and 77B provide for increased ability of finger seal 66 to seal cavity 70. In particular, finger seal 66 utilizes two layers because each layer 77A and 77B is divided into a number of spaced finger elements (see FIG. 3B) that extend from a common torus. The spaced finger elements are used in order to reduce the hoop stress in the finger seal 66. The space between the finger elements creates a gap; however, this gap is sealed by the adjoining layer which is positioned such that the finger elements of each layer block any gaps of the adjacent layer to reduce gas leakage. In other embodiments, finger seal may include three or more layers or have only a single layer.

Free end 76 of finger seal 66 extends to contact inner radial surface 86 of second module 44 at peak 84 of arcuate segments 82A and 82B. As shown in FIG. 4, free end 76 extends to aft end 80. Prior to reaching aft end 80, free end 76 extends both aft and radially outward along arcuate portion 82B to peak 84. Free end 76 then extends aft and radially inward from peak 84 along arcuate portion 82A to aft end 80. Thus, peak 84 is disposed between arcuate portions 82A and 82B and comprises the outermost radial portion of free end 76. In other embodiments free end 76 may contact other portions of second module 44, including features on casing 47 or vane 78.

As discussed previously, free end 76 is arranged with respect to second module 44 such that free end 76 is deflected by second module 44 when first and second modules 42 and 44 are mounted together. This deflection occurs because peak 84 contacts inner radial surface 86, and thus, prevents ingestion gas flow 68 from passing finger seal 66 and entering cavity 70.

A finger seal is mounted to a first module and extends across a joint between the first module and a second module.

The finger seal is fixed on a first end to the first module and is free on a second end. The free end is arranged to contact and be deflected by the second module along an arcuate portion of the finger seal. The finger seal acts to seal and redirect an ingestion gas flow away from the joint between the modules and/or keep cooling air in the area of the joint.

Discussion of Possible Embodiments

The following are non-exclusive descriptions of possible embodiments of the present invention.

An assembly for a gas turbine engine includes a first module, a second module, and a finger seal. The second module is connected to the first module along a joint. The finger seal is connected to the first module at a fixed end and has a free end that cantilevers from the fixed end to contact the second module. The finger seal acts to seal the joint between the first module and second module from an ingestion gas flow of the gas turbine engine.

The assembly of the preceding paragraph can optionally include, additionally and/or alternatively, any one or more of the following features, configurations and/or additional components:

the contact between the finger seal and the second module occurs along a peak of an arcuate portion of the finger seal;

the arcuate portion occurs adjacent an end of the finger seal;

the arcuate portion is adapted to mitigate damage to the finger seal upon installation;

the finger seal is comprised of two or more layers;

the second module causes deflection of the finger seal;

the first module comprises an outer radial casing section and the second module comprises an outer radial casing section;

the first module is disposed upstream of the second module with respect to a direction of main engine gas flow through the gas turbine engine and a trailing end of the first module is connected to a leading end of the second module;

the finger seal directs the ingestion flow into a space between the turbine frame and a fairing; and the second module has a chamfer adapted to mitigate damage to the finger seal upon installation.

An assembly for a gas turbine engine includes a first outer radial casing section, a second outer radial casing section, and a finger seal. The second casing section has a leading end that is connected to a trailing end of the first casing section. The finger seal is mounted to the first casing section at a fixed end and is contacted and deflected by the second casing section along an arcuate portion of a free end of the finger seal.

The assembly of the preceding paragraph can optionally include, additionally and/or alternatively, any one or more of the following features, configurations and/or additional components:

the contact between the finger seal and the second casing section occurs along a peak of the arcuate portion of the finger seal;

the arcuate portion occurs adjacent an end of the finger seal;

the arcuate portion is adapted to mitigate damage to the finger seal upon installation;

the second casing section has a chamfer adapted to mitigate damage to the finger seal upon installation; and the finger seal causes an ingestion gas flow to change a flow direction and pass between a fairing and the first casing section.

A turbine section for a gas turbine engine includes a first module, a second module, and a finger seal. The first module has a first casing section disposed radially outward of a fairing. The second module has a second casing section with a leading end that is connected to a trailing end of the first casing section. The finger seal is disposed radially outward from both the fairing and a main gas flow path of the gas turbine engine. The finger seal cantilevers from a first fixed section mounted to the first casing section to a free end that is deflected by the second casing section. The free end has an arcuate portion with a peak that is arranged to contact an inner radial surface of the second casing section in order to seal an area between the first casing section and the second casing section from an ingestion gas flow.

The turbine section of the preceding paragraph can optionally include, additionally and/or alternatively, any one or more of the following features, configurations and/or additional components:

the finger seal is comprised of two or more layers;

the arcuate portion adapted to mitigate damage to the finger seal upon installation and the arcuate portion occurs adjacent and aft end of the finger seal; and the second casing section has a chamfer adapted to mitigate damage to the finger seal upon installation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
   a first module;
   a second module connected to the first module along a joint; and
   a finger seal connected to the first module at a fixed end and having a free end that cantilevers from the fixed end to contact the second module, wherein the finger seal seals the joint between the first module and second module from an ingestion gas flow of the gas turbine engine, wherein the finger seal causes the ingestion gas flow to change a flow direction and pass between a fairing and the first module.

2. The assembly of claim 1, wherein the contact between the finger seal and the second module occurs along a peak of an arcuate portion of the finger seal.

3. The assembly of claim 1, wherein the arcuate portion occurs adjacent an end of the finger seal.

4. The assembly of claim 3, wherein the arcuate portion is adapted to mitigate damage to the finger seal upon installation.

5. The assembly of claim 1, wherein the finger seal is comprised of two or more layers.

6. The assembly of claim 1, wherein the second module causes deflection of the finger seal.

7. The assembly of claim 1, wherein the first module is disposed upstream of the second module with respect to a direction of main engine gas flow through the gas turbine engine, and wherein a trailing end of the first module is connected to a leading end of the second module.

8. The assembly of claim 1, wherein the second module has a chamfer adapted to mitigate damage to the finger seal upon installation.

9. The assembly of claim 1, wherein the first module comprises an outer radial casing section and the second module comprises an outer radial casing section.

10. An assembly for a gas turbine engine, comprising:
a first outer radial casing section;
a second outer radial casing section having a leading end connected to a trailing end of the first casing section; and
a finger seal mounted to the first casing section at a fixed end and contacted and deflected by the second casing section along an arcuate portion of a free end of the finger seal, wherein the finger seal causes an ingestion gas flow to change a flow direction and pass between a fairing and the first casing section.

11. The assembly of claim 10, wherein the contact between the finger seal and the second casing section occurs along a peak of the arcuate portion of the finger seal.

12. The assembly of claim 10, wherein the arcuate portion occurs adjacent an end of the finger seal.

13. The assembly of claim 12, wherein the arcuate portion is adapted to mitigate damage to the finger seal upon installation.

14. The assembly of claim 13, wherein the second casing section has a chamfer adapted to mitigate damage to the finger seal upon installation.

15. A turbine section for a gas turbine engine, comprising:
a first module having a first casing section disposed radially outward of a fairing;
a second module having a second casing section with a leading end connected to a trailing end of the first casing section; and
a finger seal disposed radially outward from both the fairing and a main gas flow path of the gas turbine engine, wherein the finger seal cantilevers from a fixed end mounted to the first casing section to a free end that is deflected by the second casing section, wherein the free end has an arcuate portion with a peak that is arranged to contact an inner radial surface of the second casing section in order to seal an area between the first casing section and the second casing section from an ingestion gas flow.

16. The turbine section of claim 15, wherein the finger seal is comprised of two or more layers.

17. The turbine section of claim 15, wherein the arcuate portion occurs adjacent an end of the finger seal, and wherein the arcuate portion adapted to mitigate damage to the finger seal upon installation.

18. The turbine section of claim 15, wherein the second casing section has a chamfer adapted to mitigate damage to the finger seal upon installation.

19. An assembly for a gas turbine engine, comprising:
a first module;
a second module connected to the first module along a joint; and
a finger seal connected to the first module at a fixed end and having a free end that cantilevers from the fixed end to contact the second module, wherein the finger seal seals the joint between the first module and second module from an ingestion gas flow of the gas turbine engine, wherein the second module has a chamfer adapted to mitigate damage to the finger seal upon installation.

* * * * *